United States Patent
Luo et al.

(10) Patent No.: US 11,809,210 B2
(45) Date of Patent: Nov. 7, 2023

(54) MAXIMUM VOLTAGE SELECTOR CIRCUIT HAVING ADAPTIVE CURRENT BIAS GENERATOR

(71) Applicant: TEXAS INSTRUMENTS INCORPORATED, Dallas, TX (US)

(72) Inventors: Ming Luo, Shanghai (CN); Andres Blanco, Garland, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 74 days.

(21) Appl. No.: 17/399,310

(22) Filed: Aug. 11, 2021

(65) Prior Publication Data

US 2022/0091625 A1 Mar. 24, 2022

Related U.S. Application Data

(60) Provisional application No. 63/082,540, filed on Sep. 24, 2020.

(51) Int. Cl.
*H02M 3/158* (2006.01)
*G05F 3/26* (2006.01)
(Continued)

(52) U.S. Cl.
CPC .............. *G05F 3/262* (2013.01); *H02M 1/08* (2013.01); *H02M 1/32* (2013.01); *H02M 3/158* (2013.01);
(Continued)

(58) Field of Classification Search
CPC .... H02M 3/156; H02M 3/1566; H02M 3/158; H02M 3/1582; H02M 3/1584;
(Continued)

(56) References Cited

U.S. PATENT DOCUMENTS 6,847,249 B1   1/2005 Brokaw
11,320,850 B1 * 5/2022 Myles ................... H03K 19/20
(Continued)

OTHER PUBLICATIONS

Texas Instruments; "TPS61099x Synchronous Boost Converter with Ultra-Low Quiescent Current"; May 2018; Texas Instruments; Revised Edition; All Pages (Year: 2018).*

(Continued)

*Primary Examiner* — Thienvu V Tran
*Assistant Examiner* — Shahzeb K Ahmad
(74) *Attorney, Agent, or Firm* — Ray A. King; Frank D. Cimino

(57) ABSTRACT

A voltage selector circuit includes a voltage comparator, a multiplexer, and an adaptive current bias generator. The voltage comparator receives first and second input voltages, and outputs a comparator signal based on the first and second input voltages. The multiplexer selects a larger of the first and second input voltages in time based on first comparator signal. The adaptive current bias generator generates a bias current for the voltage comparator during a transition from a first state to a second state. The first input voltage is continuously larger than the second input voltage during the first state, and the second input voltage is continuously larger than the first input voltage in the second state. The bias current during the transition has a time-varying current level that is proportional to a time-varying difference between the first input voltage and the second input voltage during the transition.

20 Claims, 7 Drawing Sheets

(51) Int. Cl.
*H02M 1/08* (2006.01)
*H02M 1/32* (2007.01)
H02M 1/00 (2006.01)
H02M 3/156 (2006.01)

(52) U.S. Cl.
CPC ........ *H02M 1/0019* (2021.05); *H02M 1/0022* (2021.05); *H02M 3/1566* (2021.05)

(58) Field of Classification Search
CPC .............. H02M 3/1586; H02M 3/335; H02M 3/33507; H02M 1/0003; H02M 1/0019; H02M 1/0022; H02M 1/08; H02M 1/32; G05F 3/26; G05F 3/262; H03K 17/687; H03K 17/693; H03K 19/20; H03K 2217/0018; H02J 1/10
See application file for complete search history.

(56) References Cited

U.S. PATENT DOCUMENTS

| | | | | |
|---|---|---|---|---|
| 2015/0180469 A1* | 6/2015 | Kim | ............... | H03K 17/687 |
| | | | | 327/537 |
| 2017/0126005 A1* | 5/2017 | Elsayed | ............ | G06F 1/305 |
| 2017/0310159 A1* | 10/2017 | Batra | ................. | H03K 17/687 |
| 2019/0207595 A1* | 7/2019 | Papriwal | ............. | H03K 5/2472 |
| 2019/0305676 A1* | 10/2019 | Dietrich | ............. | H02M 3/1582 |
| 2019/0354125 A1* | 11/2019 | Hubbard | ................ | H03K 5/24 |

OTHER PUBLICATIONS

Texas Instruments; "TPS61099x Synchronous Boost Converter with Ultra-Low Quiescent Current"; TPS61099; Jul. 2016— Revised May 2018.

\* cited by examiner

MAXIMUM VOLTAGE SELECTOR CIRCUIT HAVING ADAPTIVE CURRENT BIAS GENERATOR

REFERENCE TO RELATED APPLICATION

This Application claims the benefit of U.S. Provisional Application Ser. No. 63/082,540, filed on Sep. 24, 2020, the contents of which are hereby incorporated by reference in their entirety.

BACKGROUND

A DC-to-DC converter is an electronic circuit or electromechanical device that converts a source of direct current (DC) from a first voltage level to a second voltage level. DC-to-DC converters are used in portable electronic devices such as cellular phones and laptop computers, which are often supplied with power from a battery or external supply. Such electronic devices often contain several sub-circuits, each with its own voltage level requirement different from that supplied by the battery (sometimes higher or lower than the battery voltage). Additionally, the battery voltage declines as its stored energy is drained. DC-to-DC converters can step up and/or step down a first voltage from a battery, to thereby provide a second voltage (e.g., a stepped up voltage and/or stepped down voltage) for sub-circuits in the electronic device.

SUMMARY

A voltage selector circuit includes a voltage comparator, a multiplexer, and an adaptive current bias generator. The voltage comparator receives first and second input voltages, and outputs a comparator signal based on the first and second input voltages. The multiplexer selects a larger of the first and second input voltages in time based on first comparator signal. The adaptive current bias generator generates a bias current for the voltage comparator during a transition from a first state to a second state. The first input voltage is continuously larger than the second input voltage during the first state, and the second input voltage is continuously larger than the first input voltage in the second state. The bias current during the transition has a time-varying current level that is proportional to a time-varying difference between the first input voltage and the second input voltage during the transition.

DETAILED DESCRIPTION

The drawings may not be drawn to scale.

Figure 1:
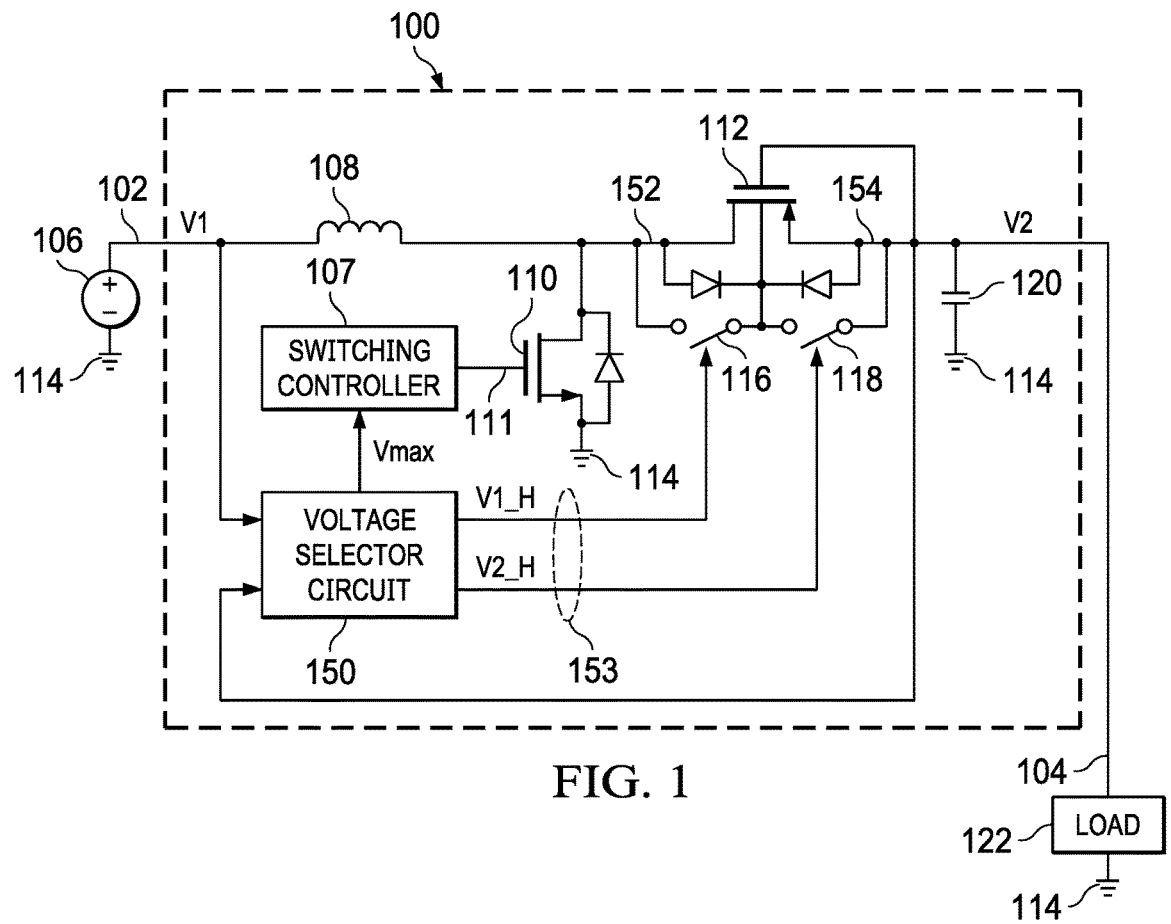
FIG. 1 illustrates a DC-to-DC converter system comprising a direct current (DC) to DC converter including a voltage selector circuit, according to one aspect of this description.

FIG. 1 illustrates an embodiment of a Direct-Current (DC)-to-DC converter system for an electronic device, such as a laptop, mobile phone, or the like. The DC-to-DC converter system includes a DC-to-DC converter 100 including an input 102 on which a first voltage (V1) is provided, and an output 104 on which a second voltage (V2) is provided. In this example, the DC-to-DC converter 100 is a boost converter, such that the second voltage is "boosted" relative to the first voltage (e.g., the second voltage is greater than the first voltage). However, in other examples DC-to-DC converters in accordance with this disclosure can manifest as a buck converter, a buck-boost converter, or another type of DC-to-DC converter; and thus the second voltage can be less than the first voltage in other embodiments, and/or the polarity of the first voltage can be opposite that of the second voltage. Further, the first and second voltages are "DC" voltages, meaning they have substantially constant voltage levels, however, there may be small deviations or ripples in these voltage levels in time in real world implementations. For example, in some embodiments, during steady state conditions, the small deviations or ripples in the first and second voltages may be less than +/−5% of the respective constant voltage levels for the first and second voltages, and in other embodiments may even be less than +/−1% of the respective constant voltage levels for the first and second voltages.

The DC-to-DC converter 100 includes a power supply 106, such as a battery, configured to provide the first voltage, and a load 122, such as an integrated circuit, visual display, audio device, and/or other electronic device, that is configured to operate at the second voltage. The second voltage differs from the first voltage, and the DC-to-DC converter is configured to convert the first voltage to the second voltage accordingly. To promote this DC-to-DC voltage conversion, the DC-to-DC converter 100 includes an inductor 108 and an isolation device 112 (such as a diode and/or field effect transistor) arranged in series on a current path extending between the input 102 and output 104. A switching device 110 and a capacitor 120 branch off of the current path, and are arranged in parallel with one another between the current path and ground 114. In the illustrated embodiment, the isolation device 112 manifests as a metal-oxide-semiconductor field-effect transistor (MOSFET), where a first body bias switch 116 is configured to selectively couple a body of the MOSFET to the input 102 and a second body bias switch 118 is configured to selectively couple the body of the MOSFET to the output 104. A switching controller 107 controls switching of the switching device 110. A cathode of the isolation device 112 is coupled to the gate of the MOSFET in the illustrated example, but in other examples the gate of the MOSFET could be coupled to the switching controller 107.

During a first stage of operation, switching controller 107 can provide a control signal to gate 111 to initially open the switching device 110, such that current flows from the power supply 106 to charge the capacitor 120. Next, during a second stage of operation, switching controller 107 can alter the control signal on gate 111 to close the switching device 110, causing current from the power supply 106 through the inductor 108 to be diverted through the switching device 110 without charging the capacitor 120. During this second stage, the current passing through the inductor 108 stores energy in the magnetic field of the inductor 108; and ideally, the isolation device 112 is reversed biased which causes the capacitor 120 to stay charged. Next, during a third stage of operation, the switching controller 107 re-opens the switching device 110, and current to the inductor 108 from the power supply 106 is stopped/reduced, which causes the inductor 108 to respond by using the energy stored in its magnetic field to generate a large voltage with the opposite polarity to the originally supplied voltage from the power supply 106. Thus, the inductor 108 acts as a voltage source in series with the power supply 106, and an anode 152 of the isolation device 112 is now at a higher voltage than the cathode 154, such that the isolation device 112 is forward biased. The capacitor 120 is thereby charged to a higher voltage, such that the second voltage V2 is stepped up or "boosted" relative to the first voltage V1. The switching controller 107 can control the duty cycle on gate 111 in an ongoing manner to control the second voltage V2 to keep it boosted or provide other desired voltage characteristics for the second voltage in time. In some embodiments, another state of operation known as "discontinuous conduction mode (DCM)" can also be used during which both switching device 110 and isolation device 112 are both opened/off, and inductor current is zero.

However, small and/or rapid fluctuations in current and/or voltage at the load 122 and/or at the power supply 106 can cause unexpected and undesirable transients in the first voltage and/or second voltage. These transients can arise due to changing operating conditions at the load 122 (e.g., when the load 122 initially "wakes up" from a sleep mode) and/or changes in the voltage of the power supply 106 (e.g., battery voltage diminishing over time), among others. Whatever the underlying cause, absent countermeasures, these transients in the first voltage and/or second voltage could allow the isolation device 112 to be unexpectedly forward biased (e.g., during the second stage of operation above), and could allow current to undesirably flow from the output 104 to the input 102 (and/or vice versa), which could for example lead to a short or latch-up. To limit the likelihood of this occurring, FIG. 1's DC-to-DC converter 100 includes a voltage selector circuit 150 that compares the first voltage and second voltage and provides control signals V1_H, V2_H to the isolation device 112 to help ensure the body of the MOSFET is properly biased to prevent undesired current flow between input 102 and output 104. Thus, in FIG. 1, for example, the voltage selector circuit 150 provides a comparator signal 153, for example in the form of control signals V1_H and V2_H, to electrically couple the body of the MOSFET of isolation device 112 to the larger of the first voltage and the second voltage, which prevents the body diode of the MOSFET of isolation device 112 from being undesirably forward biased. Thus, if V1 is larger than V2, V1_H is asserted to close first body bias switch 116, and the body of the MOSFET of isolation device 112 is coupled to the input 102 (while V2_H is de-asserted to open the second body switch 118). Conversely, if V2 is larger than V1, V2_H is asserted to close second body bias switch 118 and the body of the MOSFET of isolation device 112 is coupled to the output V2 (while V1_H is de-asserted to open the first body switch 116).

Aspects of the present disclosure lie in the appreciation that it is advantageous to provide a voltage selector circuit with a very small current draw to maximize the operating lifetime of the power supply 106 (e.g., battery between charges), while at the same time providing a fast response time to transient voltages and/or currents in the system. In such instances, by more rapidly detecting a change in which of the first and second voltages V1, V2 are larger, the voltage selector circuit may electrically couple the body of the isolation device to the larger voltage of V1 or V2 before latch-up occurs, thereby increasing an endurance and performance of the portable electronic device. Accordingly, some disclosed voltage selector circuits strike a balance between lowering a power consumption and improving the response time such that a change in the larger of the first and second voltages V1, V2 is quickly detected, which is advantageous for performance and/or reliability reasons.

Figure 2:
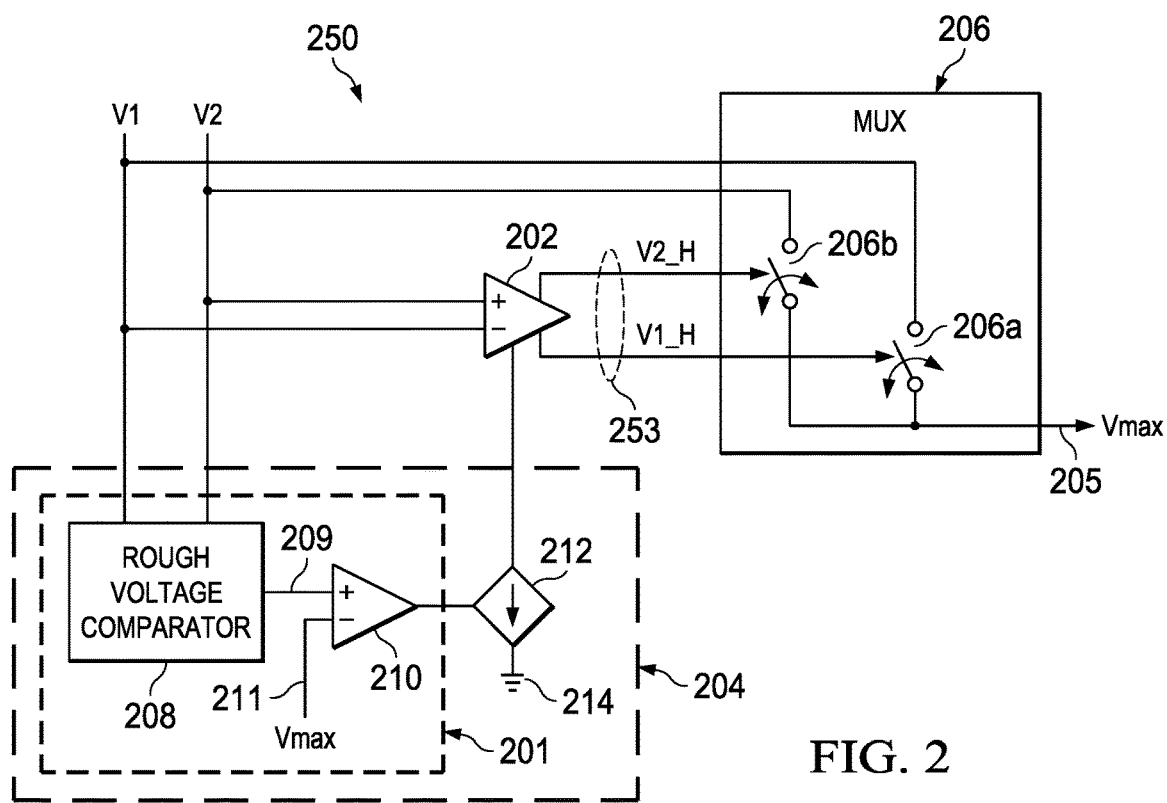
FIG. 2 illustrates a diagram of a voltage selector circuit comprising an adaptive current bias generator, according to one aspect of this description.

FIG. 2 illustrates a voltage selector circuit 250 according to one aspect of this disclosure. The voltage selector circuit 250 may be included in a DC-to-DC converter, and thus may correspond to 150 within the DC-to-DC converter 100 illustrated in FIG. 1, but may also be employed in other DC-to-DC converters and/or in a number of other applications as well. The voltage selector circuit 250 includes a voltage comparator 202, an adaptive current bias generator 204, and a multiplexer (MUX) 206. The voltage comparator 202 provides a comparator signal 253 that is indicative of whether the first input voltage or the second input voltage is larger. The multiplexer (MUX) 206 includes output switches 206a, 206b, configured to select a larger of the first input voltage and the second input voltage based on the comparator signal 253 from the voltage comparator 202, and this selected voltage is referred to as a maximum voltage 205 (VMax). The adaptive current bias generator 204 provides a variable bias current to the voltage comparator 202 based on the first input voltage V1, the second input voltage V2, and the maximum voltage, which is provided on input 211. Advantageously, the voltage selector circuit 250 can operate with a relatively low quiescent current (e.g., at nanoamp levels, about 1 nanoamp or less, or the like) to reduce power consumption, thereby extending usage of the portable electronic device between battery charging operations.

More particularly, the first input voltage V1 and the second input voltage V2 are each provided to respective inputs of the adaptive current bias generator 204, the voltage comparator 202, and the multiplexer 206. The voltage comparator 202 is configured to determine the maximum voltage between the first input voltage V1 and the second input voltage V2. The voltage comparator 202 outputs a comparator signal 253 that indicates which of the first and second input voltages V1, V2 is larger. The comparator signal 253 is provided to a control input of the multiplexer 206, such that the multiplexer 206 outputs a maximum voltage 205 based on the comparator signal 253, where the maximum voltage 205 tracks the first input voltage V1 and the second input voltage V2. In some embodiments, the comparator signal 253 is latched, such that V1_H and VH_2 remain constant until there is a change in which of the first input voltage and the second input voltage is larger. For example, if the first input voltage is initially continuously larger than the second input voltage in a first state, then V1_H is continuously asserted and the maximum voltage 205 is equal to the first input voltage V1. Thus, during this first state, even if V1 varies slightly, Vmax will track V1 because V1_H remains asserted. However, when the second input voltage becomes larger than the first input voltage during a second state, then the V1_H and V2_H toggle, such that V2_H is continuously asserted during the second state causing Vmax to switch to track V2 rather than V1. Thus, in some aspects, the voltage selector circuit 250 is configured to continuously monitor the first and second input voltages V1, V2 to determine if the maximum voltage changes. In response to the voltage selector circuit 250 detecting a change in the maximum voltage, the voltage selector circuit 250 is configured to update the comparator signal 253 and the maximum voltage 205 to reflect the change in the maximum voltage between the first and second input voltages V1, V2.

To allow continuous monitoring of the larger of the first and second input voltages V1, V2, the adaptive current bias generator 204 is configured to source a variable current for the voltage comparator 202 with an extremely low operating current and quiescent current. This allows the voltage comparator 202 to continuously monitor which of V1 and V2 is larger and select the larger of V1 and V2 in an on-going fashion (and for example, provide control signals V1_H, V2_H to a diode or other isolation element to keep appropriate body biases as described in FIG. 1) while consuming limited power. In some instances, the adaptive current bias generator 204 comprises a rough voltage comparator 208, an amplifier 210, and a variable current source 212.

The rough voltage comparator 208 receives the first input voltage V1 and the second input voltage V2, and is configured to output a real-time estimated maximum voltage 209 based on a comparison between the first input voltage V1 and the second input voltage V2. In at least one example, a value of the real-time estimated maximum voltage 209 is within a range between the first input voltage V1 and the second input voltage V2. For example, if the first input voltage V1 is approximately 1 volt and the second input voltage V2 is approximately 3 volts, then the real-time estimated maximum voltage 209 may be about 3 volts or may be within a range between about 1 and 3 volts. Unless otherwise stated, in this description, "about" or "approximately" preceding a value means +/−10 percent of the state value. Thus, the rough voltage comparator 208 is configured to determine a real-time estimated voltage value equal to the larger of the first input voltage V1 or the second input voltage V2 or a voltage between the first input voltage V1 and second input voltage V2. In some embodiments, transistors in the rough voltage comparator 208 have a lower threshold voltage than those implemented in the voltage comparator 202, which can help facilitate low-power detection of whether V1 or V2 is larger.

The amplifier 210 comprises a first input configured to receive the real-time estimated maximum voltage 209 and a second input configured to receive a previously latched maximum voltage (Vmax) 205 of V1 or V2. A gain of the amplifier 210 is determined by a difference between the real-time estimated maximum voltage 209 and the previously latched maximum voltage 205. The amplifier 210 has an output is coupled to the controlled current source 212, and provides a voltage to set the current level of the controlled current source 212.

The controlled current source 212 is electrically coupled between the voltage comparator 202 and ground 214. The controlled current source 212 is configured to source or sink a variable bias current to the voltage comparator 202 based on the output of the amplifier 210. When output of the amplifier is in a first state (e.g., the first input voltage remains continuously greater than the second input voltage, or vice versa), the bias current is in fact zero or is substantially zero. However, when the output of the amplifier changes state (e.g., the first input voltage increases to be greater than the second input voltage, or vice versa), the bias current has a time-varying current level that is proportional to a time-varying difference between the first input voltage and the second input voltage during this transition. Thus, for example, when a value of the real-time estimated maximum voltage 209 increases above the previously latched maximum voltage (Vmax) 205, the bias current provided by the controlled current source 212 to the voltage comparator 202 is increased. This increased bias current improves a response time of the voltage comparator 202, such that the voltage selector circuit 250 may more quickly detect and/or update a change in the larger value of the first and second input voltages V1, V2.

Figure 3A:
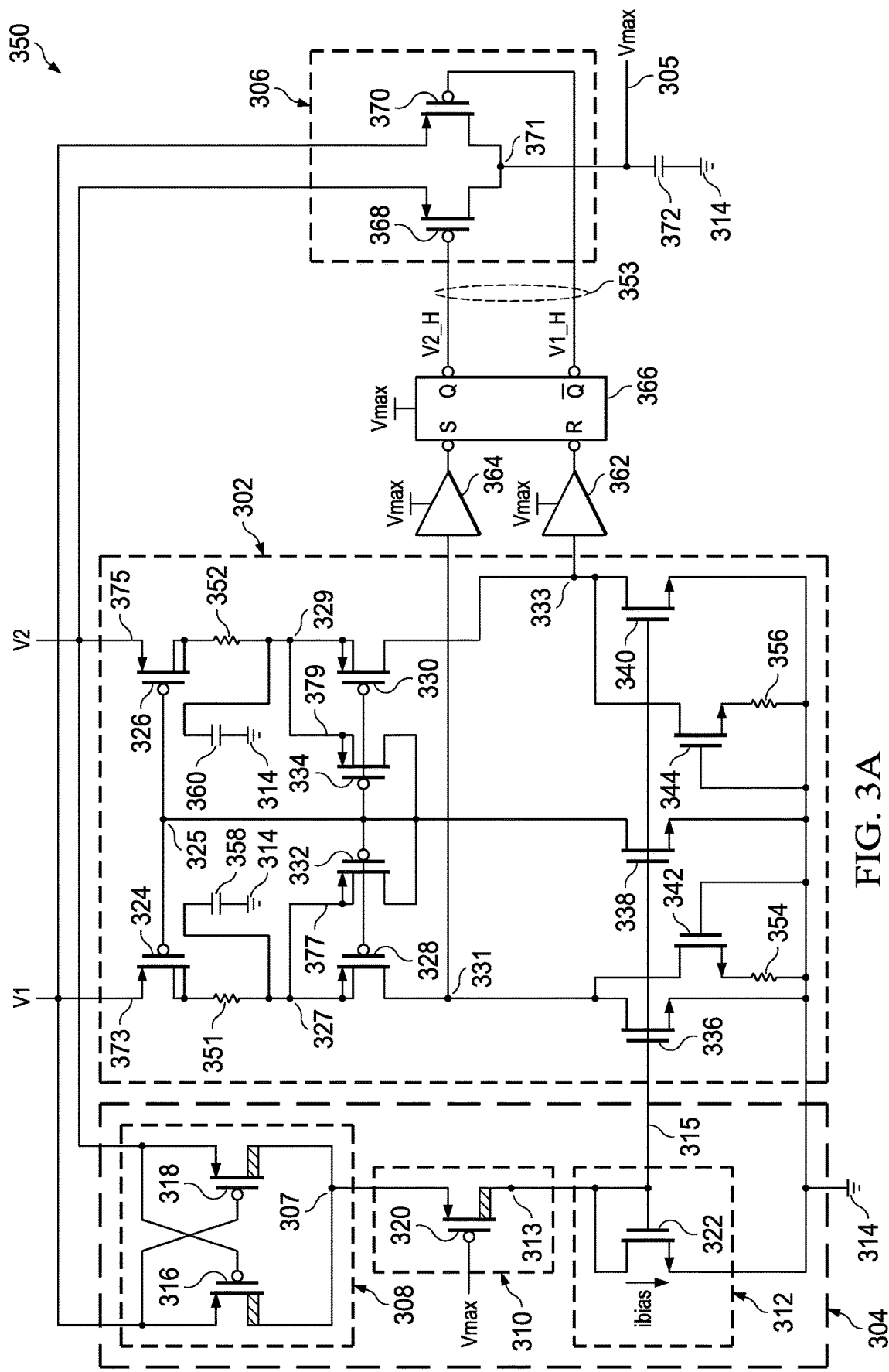
FIG. 3A illustrates an example implementation of a voltage selector circuit comprising an adaptive current bias generator, according to one aspect of this description.

FIG. 3A illustrates a diagram of an example implementation of a voltage selector circuit 350, according to one aspect of this description. The voltage selector circuit 350 may comprise some aspects of the voltage selector circuit 150 in FIG. 1 and/or voltage selector circuit 250 in FIG. 2 (and vice versa); and thus, the features explained above with regards to FIG. 1 and/or FIG. 2 are also applicable to the voltage selector circuit in FIG. 3A (and vice versa).

In some aspects, the voltage selector circuit 350 comprises a voltage comparator 302, an adaptive current bias generator 304, buffers 362, 364, a latch 366, and a multiplexer 306. A first input voltage V1 and a second input voltage V2, which differ from one another, are each provided to input terminals of the adaptive current bias generator 304, the voltage comparator 302, and the multiplexer 306. The voltage selector circuit 350 has first and second voltage comparator outputs 331, 333 whose output voltages are indicative of the larger of the first input voltage V1 and the second input voltage V2. Changes in these output voltages toggle latch 366, and thereby control multiplexer 306. Thus, during a first state in which the second input voltage V2 is continuously larger than the first input voltage V1, Vmax 305 tracks the second input voltage V2; and during a second state in which the first input voltage V1 is continuously larger than the second input voltage V2, Vmax 305 tracks the first input voltage V1.

To implement this functionality, the adaptive current bias generator 304 comprises a rough voltage comparator 308, an amplifier 310, and a controlled current source 312. In some instances, the rough voltage comparator 308 comprises a first transistor 316 and a second transistor 318. The first transistor 316 includes a source coupled to the first input voltage V1, a drain coupled to a first node 307, and a gate coupled to the second input voltage V2. The second transistor 318 includes a source coupled to the second input voltage V2, a drain coupled to the first node 307, and a gate coupled to the first input voltage V1. Thus, in some instances, the gate of the first transistor 316 is electrically coupled to the source of the second transistor 318 and the second input voltage V2, and the gate of the second transistor 318 is electrically coupled to the source of the first transistor 316 such that the first and second transistors 316, 318 are in a cross-gate configuration.

The amplifier 310 comprises a third transistor 320. A source of the third transistor 320 is coupled to the first node 307 and the drains of the first and second transistors 316, 318. The third transistor 320 includes a drain coupled to a second node 313 and a gate coupled to the maximum voltage (Vmax) 305. In some instances, the first, second, and third transistors 316, 318, and 320 are each configured as a p-channel metal-oxide semiconductor (pMOS) transistor, a low threshold voltage (LVT) pMOS transistor, some other suitable field effect transistor (FET), or the like. For example a threshold voltage of each of the LVT transistors 316, 318, and 320 may be about 240 millivolts (mV), or another suitable value. In at least one example, the transistors 316, 318, and 320 respectively have the same threshold voltage as one another.

The controlled current source 312 comprises a fourth transistor 322. The fourth transistor 322 may be configured as a diode-connected FET such that a drain and a gate of the fourth transistor 322 are coupled to the second node 313 (e.g., coupled to the drain of the third transistor 320) and a source of the fourth transistor 322 is coupled to ground terminal 314. In some instances, the fourth transistor 322 is configured as an n-channel metal-oxide semiconductor (nMOS) transistor, some other suitable MOS device, a bipolar junction transistor (BJT), a junction-gate field effect transistor (JFET), or the like.

In some instances the second input voltage V2 is in steady state (e.g., a first state) and is greater than the first input voltage V1, and the previously latched maximum voltage 305 tracks the second input voltage V2. Thus, in such an example, the second transistor 318 is driven on and the first transistor 316 is off such that a real-time estimated maximum voltage at the first node 307 is approximately equal to the second input voltage V2. Further, because the real-time estimated maximum voltage on the first node 307 is approximately equal to (or slightly less than) the previously latched maximum voltage 305, the third transistor 320 is off and a current across the third transistor 320 is substantially zero. Similarly, bias current over fourth transistor 322 (which is mirrored over transistors 336, 338, and 340) is also substantially zero. Accordingly, in response to the voltage selector circuit 350 being in the first state (e.g., steady state V2>V1 and previously latched maximum voltage 305=V2), the adaptive current bias generator 304 biases the voltage comparator 302 with substantially zero amps. Thus, the voltage comparator 302 is essentially "off", although the voltage comparator 302 still provides a constant output signal to the multiplexer 306 because of latch 366, thereby providing low power consumption. In some embodiments, substantially zero amps can be less than 1 nA.

However, when at least one of V1 and V2 undergoes a transition so V1 becomes larger than V2, the maximum voltage 305 will ultimately switch to track the first input voltage V1 for this second state. At the beginning of this transition, however, the first input voltage V1 increases to a value above the second input voltage V2, but because of some built-in delay in the voltage comparator 302 (e.g., due to latch 366), the maximum voltage 305 may initially remain at V2. During this initial portion of the transition, the first transistor 316 is driven on and the second transistor 318 is off such that a real-time estimated maximum voltage 309 at the first node 307 increases to approximately the first input voltage V1 (which during the initial portion of the transition is greater than previously latched Vmax). In response to the estimated maximum voltage on first node 307 being greater than previously latched Vmax, there is sufficient headroom for transistor 320, and the third transistor 320 is driven on and a current flows across the third transistor 320. Similarly, bias current over fourth transistor 322 (which is mirrored over transistors 336, 338, and 340) also flows which enables operation of the voltage comparator 302. Now that the voltage comparator 302 is enabled by the bias current, as will be appreciated in more detail below, the voltage comparator 302 may provide comparator signal 353 to quickly update the control signals to the multiplexer 306 to switch the maximum voltage 305 to track the first input voltage V1 (which is now larger than the second input voltage V2).

The voltage comparator 302 comprises first voltage comparator current path 371 and second voltage comparator current path 373, as well as transistors 324, 326, 328, 330, 332, 334, 336, 338, 340, 342, and 344. A first transistor 324 includes a source coupled to the first input voltage V1, a drain coupled to a first resistor 351, and a gate coupled to a voltage comparator node 325. A second transistor 326 includes a source coupled to the second input voltage V2, a drain coupled to a second resistor 352, and a gate coupled to the voltage comparator node 325. Thus, the gate of the first transistor 324 is coupled to the gate of the second transistor 326. Further, a third transistor 328 includes a source coupled to a second voltage comparator node 327 (also referred to as a first branch point), a drain coupled to a first voltage comparator output node 331, and a gate coupled to the voltage comparator node 325. A fourth transistor 330 includes a source coupled to a third voltage comparator node 329 (also referred to as a second branch point), a drain coupled to a second voltage comparator output node 333, and a gate coupled to the voltage comparator node 325. A first capacitor 358 is coupled between the second voltage comparator node 327 and ground terminal 314. A second capacitor 360 is coupled between the third comparator node 329 and ground terminal 314. A fifth transistor 332 includes a source coupled to the second voltage comparator node 327, a drain coupled to the voltage comparator node 325, and a gate coupled to the voltage comparator node 325. A sixth transistor 334 includes a source coupled to the third voltage comparator node 329, a drain coupled to the voltage comparator node 325, and a gate coupled to the voltage comparator node 325, such that in some instances the fifth and sixth transistors 332, 334 are each configured as a diode-connected FET. In at least one example, the fifth and sixth transistors 332, 334 are configured to generate current across the third and fourth transistors 328, 330. In some at least one example, the transistors 336, 338, and 340 (which may also be referred to as first, second, and third voltage comparator current elements, respectively, in some instances) sink or source current through the various current paths of the voltage comparator 302 based on the voltage on node 315, and mirror the bias current through controlled current source 312. The transistors 336, 338, and 340 are each configured as an n-channel metal-oxide semiconductor (nMOS) transistor, some other suitable MOS device, a bipolar junction transistor (BJT), a junction-gate field effect transistor (JFET), or the like. In at least one example, the transistors 342 and 344 of the voltage comparator 302 may each be configured as self-starting degenerated natural (NAT) n-channel field effect transistor (NFET), an NFET, a depletion mode NFET, some other suitable FET, or the like. Resistors 354, 356 are coupled between sources of transistors 342, 344, respectively, and ground.

In at least one example, the transistors 324, 326, 328, 330, 332, and 334 of the voltage comparator 302 may be referred to as voltage comparator transistors and are each configured as a pMOS transistor, some other suitable FET, or the like. Further, in some instances, a threshold voltage of each of the transistors 324, 326, 328, 330, 332, and 334 is greater than the threshold voltage of the LVT transistors 316, 318, and 320 of the adaptive current bias generator 304. By virtue of the threshold voltage of the transistors 324, 326, 328, 330, 332, and 334 being greater than the threshold voltage of the LVT transistors 316, 318, and 320, the adaptive current bias generator 304 may detect the change in the larger of the first and second input voltages V1, V2 before enabling the voltage comparator 302, thereby reducing power consumption.

The first input buffer 362 is coupled between the first comparator output node 331 and a first input terminal of the latch 366, and the second input buffer 364 is coupled between the second comparator output node 333 and a second input terminal of the latch 366. Each of the first and second input buffers 362, 364 are driven by the maximum voltage 305. Further, the latch 366 is configured to receive the outputs of the input buffers 362, 364 and output a first latched comparison output signal (Q), and output a second latched output signal (Q-bar) which is opposite to Q.

The multiplexer 306 comprises a first output switch 368, and a second output switch 370. The first output switch 368 receives the first latched comparison output signal (V2_H), and the second output switch 370 receives the second latched output signal (V1_H), such that the multiplexer 306 selects the greater of the first input voltage V1 and second input voltage V2 as Vmax. The first output switch 368 comprises a source coupled to the first input voltage V1, a drain coupled to an output node 371, and a gate coupled to a first output terminal of the latch 366. The second output switch 370 comprises a source coupled to the second input voltage V2, a drain coupled to the output node 371, and a gate coupled to a second output terminal of the latch 366. Furthermore, an output capacitor 372 is coupled between the output node 371 and ground terminal 314. In at least one example, the latch 366 is configured as an SR-latch. In at least one example, the output switches 368, 370 are each configured as a pMOS transistor, some other suitable FET, or the like.

At stated above, during a first steady state when V2 is greater than V1, the voltage comparator 302 is essentially "off", although latch 366 provides latched output signals on 353 to the multiplexer 306. For example, when V2 is greater than V1, the Reset input node (R) of latch 366 will receive a higher voltage than the Set input node (S) of latch 366, and thus, the Q output node of latch 366 goes low and Q-bar output node of latch 366 goes high. Thus, first output switch 368 is enabled/closed and second output switch 370 is disabled/opened, such that the maximum voltage 305 tracks V2.

When V1 transitions to be greater than V2 (e.g., transition to second state as described above), the bias current (ibias) generated by transistor 322 is mirrored in transistors 336, 338, 340. Under this bias, transistor 338 can establish a voltage bias on voltage comparator node 325. This induces a first current along the left current path of voltage comparator (e.g., over 324, resistor 351, transistor 328, and transistors 336, 342); and induces a second current along the right current path of voltage comparator 302 (e.g., over 326, resistor 352, transistor 330, and transistors 340, 344). Under such conditions, the outputs of third and fourth transistors 328, 330 are configured as a comparator signal that is provided to the buffers 362, 364. The first and second transistors 324, 326 are configured to prevent reverse current flow through body diodes of the fifth and sixth transistors 332, 334 in response to a difference between the first input voltage V1 and the second input voltage V2 being relatively large. For example, in response to the first input voltage V1 being significantly greater than the second input voltage V2, the voltage at the voltage comparator node 325 is equal to the first input voltage V1 minus a gate to source voltage of the fifth transistor 332 and the voltage at the second comparator node 327 is equal to the voltage at the voltage comparator node 325 minus a diode forward voltage (e.g., about 0.7 volts), such that the first transistor 324 is off. In another example, in response to the second input voltage V2 being significantly greater than the first input voltage V1, the voltage at the voltage comparator node 325 is equal to the second input voltage V2 minus a gate to source voltage of the sixth transistor 334 and the voltage at the third comparator node 329 is equal to the voltage at the voltage comparator node 325 minus a diode forward voltage (e.g., about 0.7 volts), such that the second transistor 326 is off. A first branch current path 373 couples second comparator node 327 to the voltage comparator node 325, and a second branch current path 375 couples third comparator node 329 to the voltage comparator node 325.

The latch 366 is configured to output a first output select signal V2_H to the gate of the first output switch 368 and a second output select signal V1_H to the gate of the second output switch 370. In some instances, in response to the second input voltage V2 being greater than the first input voltage V1, the first output switch 368 is driven on by the second output select signal V2_H, and the second output switch 370 is off by virtue of the first output select signal V1_H, such that the second input voltage V2 is output to the output node 371. Under such conditions, the maximum voltage 305 is equal to the second input voltage V2. In another instance, in response to the first input voltage V1 being greater than the second input voltage V2, the first output switch 368 is off by virtue of the first output select signal V1_H and the second output switch 370 is driven on by the second output select signal V2_H, such that the first input voltage V1 is output to the output node 371. Under such conditions, the maximum voltage 305 is equal to the first input voltage V1. In at least one example, in response to the voltage comparator 302 being biased with the relatively low quiescent current (e.g., at nanoamp levels, about 1 nanoamp or less, or the like) by the adaptive current bias generator 304, the most recent values of the latch 366 are retained.

Figure 3B:
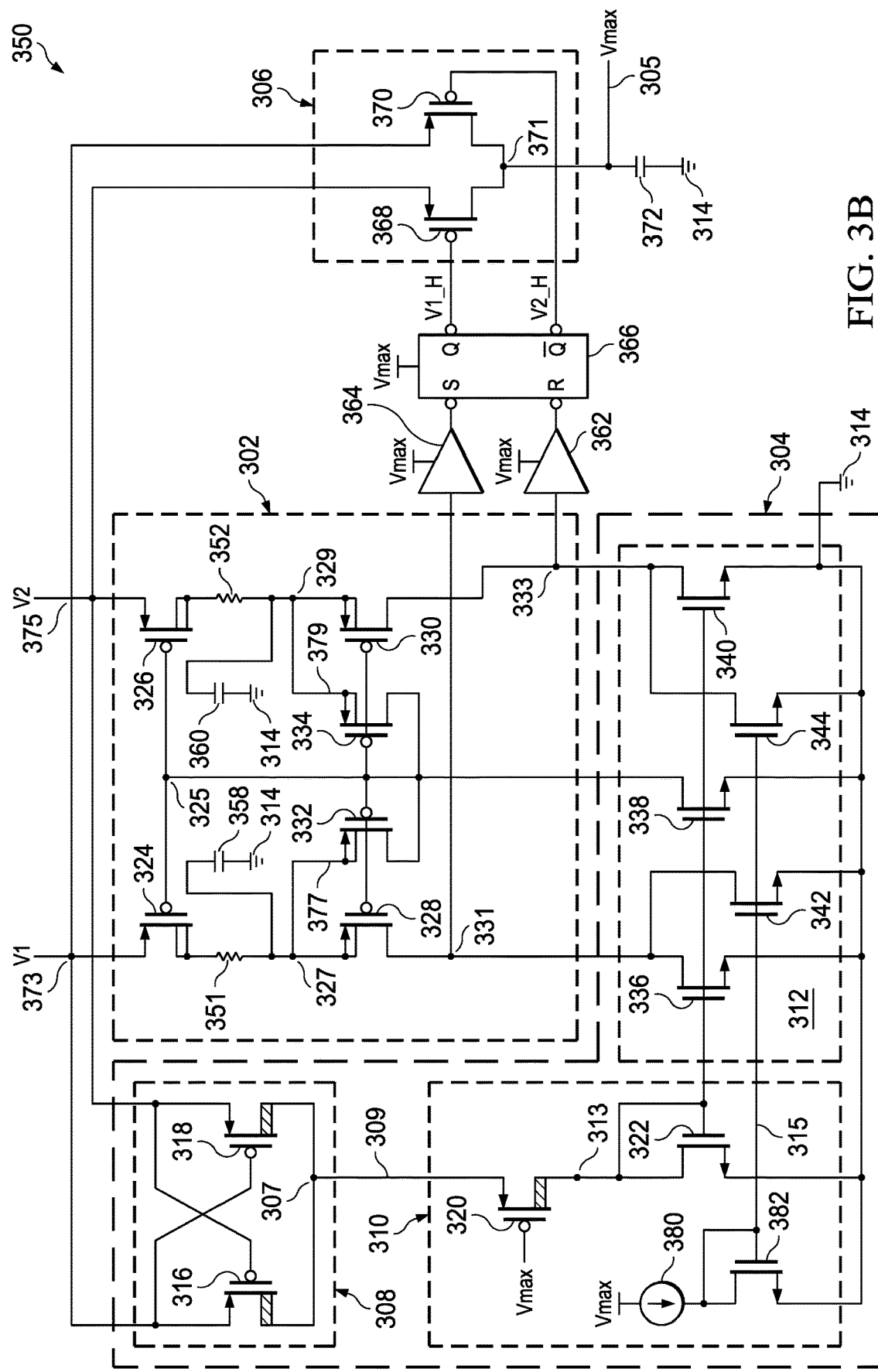
FIG. 3B illustrates an example implementation of a voltage selector circuit comprising an adaptive current bias generator, according to one aspect of this description.

FIG. 3B illustrates another implementation of a voltage selector circuit 350 according to one aspect of this description. The voltage selector circuit 350 of FIG. 3B may comprise some aspects of the voltage selector circuit in FIGS. 1, 2, and/or 3A (and vice versa); and thus, the features explained above with regards to FIGS. 1, 2, and/or 3A are also applicable to the voltage selector circuit 350 in FIG. 3B.

As illustrated in FIG. 3B, the adaptive current bias generator 304 further comprises a current source 380 and a transistor 382. The current source 380 is configured to generate a quiescent current (e.g., at nanoamp levels, about 1 nanoamp or less, or the like), where the voltage comparator 302 is biased with the quiescent current in response to the voltage selector circuit 350 being in a steady state. In at least one example, the voltage selector circuit 350 is in the steady state in response to a larger of the first input voltage V1 and the second input voltage V2 being equal to the maximum voltage 305. In some instances, the transistor 382 comprises a source coupled to ground terminal 314, a drain coupled to the current source 380, and a gate coupled to the current source 380. The transistor 382 may be configured as a diode-connected FET and is configured to conduct the quiescent current generated by the current source 380. In at least one example, the gates of the tenth and eleventh transistors 342, 344 are respectively coupled to the gate of the transistor 382, such that the tenth and eleventh transistors 342, 344 are configured as a current mirror with the transistor 382 to produce the quiescent current of the current source 380 across different branches of the voltage comparator 302. Thus, in response to the voltage selector circuit 350 being in the steady state, the voltage comparator 302 is biased with the quiescent current, which decreases a power consumption of the voltage selector circuit 350, thereby increasing a performance of the voltage selector circuit 350.

Figure 4:
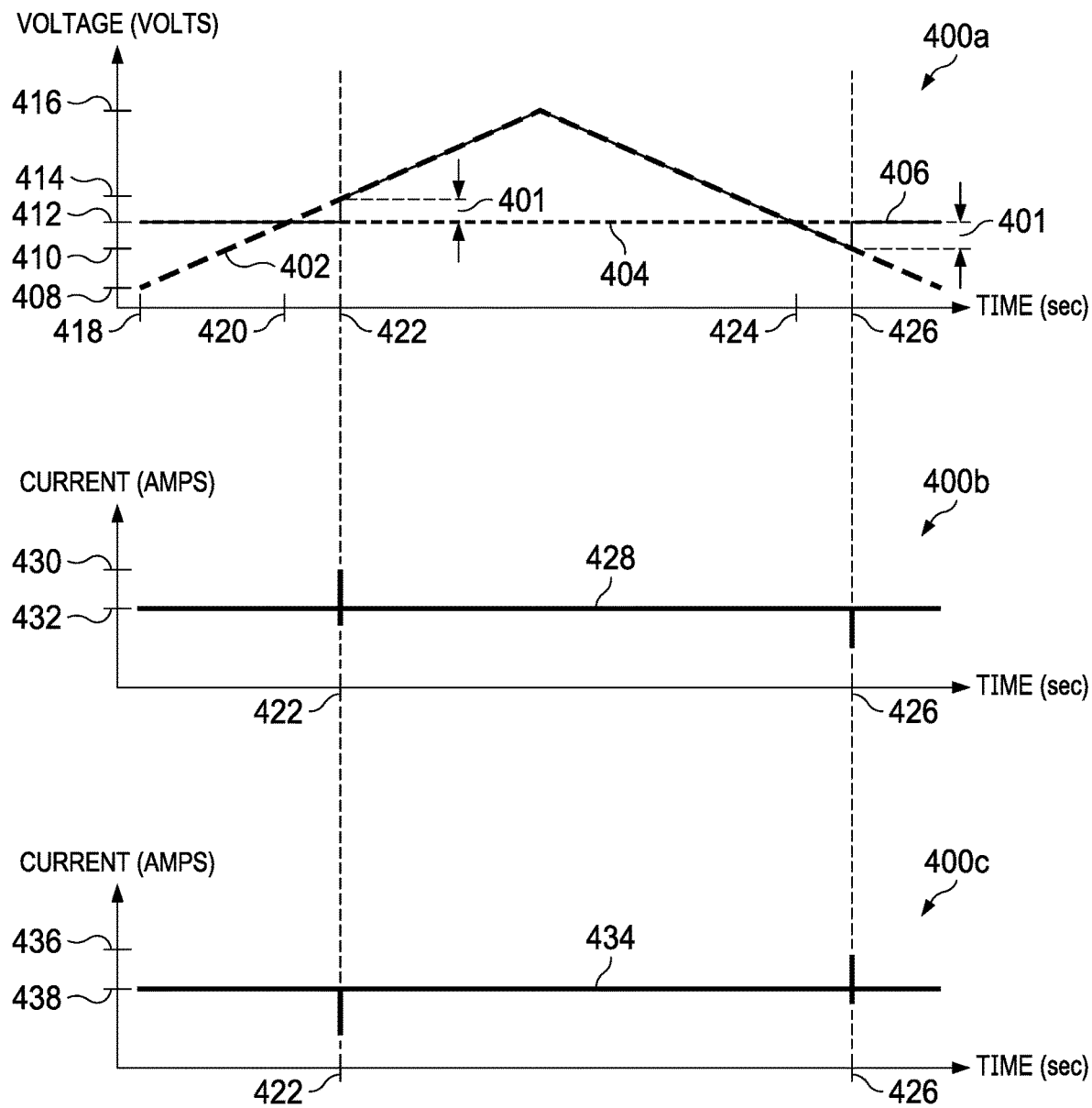
FIG. 4 illustrates graphs of signals of a voltage selector circuit comprising an adaptive current bias generator, according to one aspect of this description.

FIG. 4 illustrates graphs 400a-400c of signals of a voltage selector circuit (e.g., like that of FIG. 2, 3A, or 3B) that comprises an adaptive current bias generator (e.g., 204 of FIG. 2 or 304 of FIGS. 3A-3B), according to one aspect of this description.

Graph 400a illustrates a first input voltage 402, a second input voltage 404, and a maximum voltage 406. In at least one example, the first input voltage 402 continuously increases from a first magnitude 408 to a fifth magnitude 416. After reaching the fifth magnitude 416, the first input voltage 402 may continuously decrease from the fifth magnitude 416 to the first magnitude 408. The second input voltage 404 has a third magnitude 412 which remains constant.

In some instances, the first input voltage 402 may correspond to the voltage of an input of a DC-to-DC converter, and may be input as a first voltage (e.g., V1 of FIG. 3A) to an input of the voltage selector circuit (e.g., 350 of FIG. 3A). Further, the second input voltage 404 may correspond to the voltage of an output of a DC-to-DC converter, and may be input as a second voltage (e.g., V2 of FIG. 3A) to an input of the voltage selector circuit (e.g., 350 of FIG. 3A). A maximum voltage 406 may correspond to the maximum voltage (e.g., 305 of FIG. 3A) outputted by the voltage selector circuit (e.g., 350 of FIG. 3A).

At a first time 418 the second input voltage 404 is greater than the first input voltage 402 such that a magnitude of the maximum voltage 406 is equal to the third magnitude 412. In at least one example, at the first time 418 the voltage selector circuit (e.g., 350 of FIG. 3A) is in the first state as described in FIG. 3A above. A transition occurs at a second time 420 in which the magnitude of the first input voltage 402 is greater than the magnitude of the second input voltage 404. In at least one example, at the second time 420 the voltage selector circuit (e.g., 350 of FIG. 3A) is in the second state as described in FIG. 3A above. At a third time 422, a difference between the first input voltage 402 and the second input voltage 404 is equal to a voltage 401. In at least one example, a magnitude of the voltage 401 is equal to or greater than a magnitude of the threshold voltage of the LVT transistors (e.g., 316, 318, and 320 of FIG. 3A) of the adaptive current bias generator (e.g., 304 of FIG. 3A), such that the adaptive current bias generator (e.g., 304 of FIG. 3A) biases the voltage comparator (e.g., 302 of FIG. 3A) with a current based on the magnitude of the voltage 401. Subsequently, the voltage comparator (302 of FIG. 3A) determines the larger of the first input voltage 402 and the second input voltage 404 and sets the maximum voltage 406 to the determined larger value (e.g., sets maximum voltage 406 to first input voltage 402). In at least one example, the voltage 401 is about 240 millivolts, greater than 240 millivolts, less than half of a diode forward voltage (e.g., less than about 350 millivolts), or another suitable value. In at least one example, at the third time 422 the voltage selector circuit (e.g., 350 of FIG. 3A) is in the second state and the magnitude of the voltage 401 is equal to or greater than the threshold voltage of the LVT transistors (e.g., 316, 318, and 320 of FIG. 3A) as described in FIG. 3A above. A transition occurs at a fourth time 424 in which the magnitude of the first input voltage 402 is less than the magnitude of the second input voltage 404. At a fifth time 426, the first input voltage 402 is less than the second input voltage 404 by the voltage 401. In such instances, the adaptive current bias generator (e.g., 304 of FIG. 3A) biases the voltage comparator (e.g., 302 of FIG. 3A) with a current based on the magnitude of the voltage 401, and the voltage comparator (e.g., 302 of FIG. 3A) determines the larger of the first input voltage 402 and the second input voltage 404 and sets the maximum voltage 406 to the determined larger value (e.g., sets maximum voltage 406 to second input voltage 404).

Graph 400b illustrates a first current 428 that corresponds to the current provided into the first input terminal (V1) of the entire voltage selector circuit 350. At the third time 422, the adaptive current bias generator (e.g., 304 of FIG. 3A) biases the voltage comparator (e.g., 302 of FIG. 3A) with a current such that the voltage comparator (e.g., 302 of FIG. 3A) is driven on and the first current 428 reaches a first current value 430. In at least one example, the first current value 430 is approximately 1 milliamp or another suitable value. Further, in response to the voltage selector circuit (e.g., 350 of FIG. 3A) being in a steady state, the first current 428 is equal to a second current value 432. In at least one example, the second current value 432 is at picoamp levels, within a range of about −70 to 70 picoamps, or another suitable value. This, in part, is because the adaptive current bias generator (e.g., 304 of FIG. 3A) is configured to bias the voltage comparator (e.g., 302 of FIG. 3A) with a relatively low current during the steady state to reduce power consumption of the voltage selector circuit (e.g., 350 of FIG. 3A).

Graph 400c illustrates a second current 434 that corresponds to the current provided into the second input terminal (V2) of the entire voltage selector circuit 350. At the fifth time 426, the adaptive current bias generator (e.g., 304 of FIG. 3A) biases the voltage comparator (e.g., 302 of FIG. 3A) with a current such that the voltage comparator (e.g., 302 of FIG. 3A) is driven on and the second current 434 reaches a third current value 436. In at least one example, the third current value 436 is approximately 1 milliamp or another suitable value. Further, in response to the voltage selector circuit (e.g., 350 of FIG. 3A) being in a steady state, the second current 434 is equal to a fourth current value 438. In at least one example, the second current 434 is at picoamp levels, within a range of about −70 to 70 picoamps, or another suitable value. This reduces a power consumption of the voltage selector circuit (e.g., 350 of FIG. 3A) while in the steady state.

Figure 5:
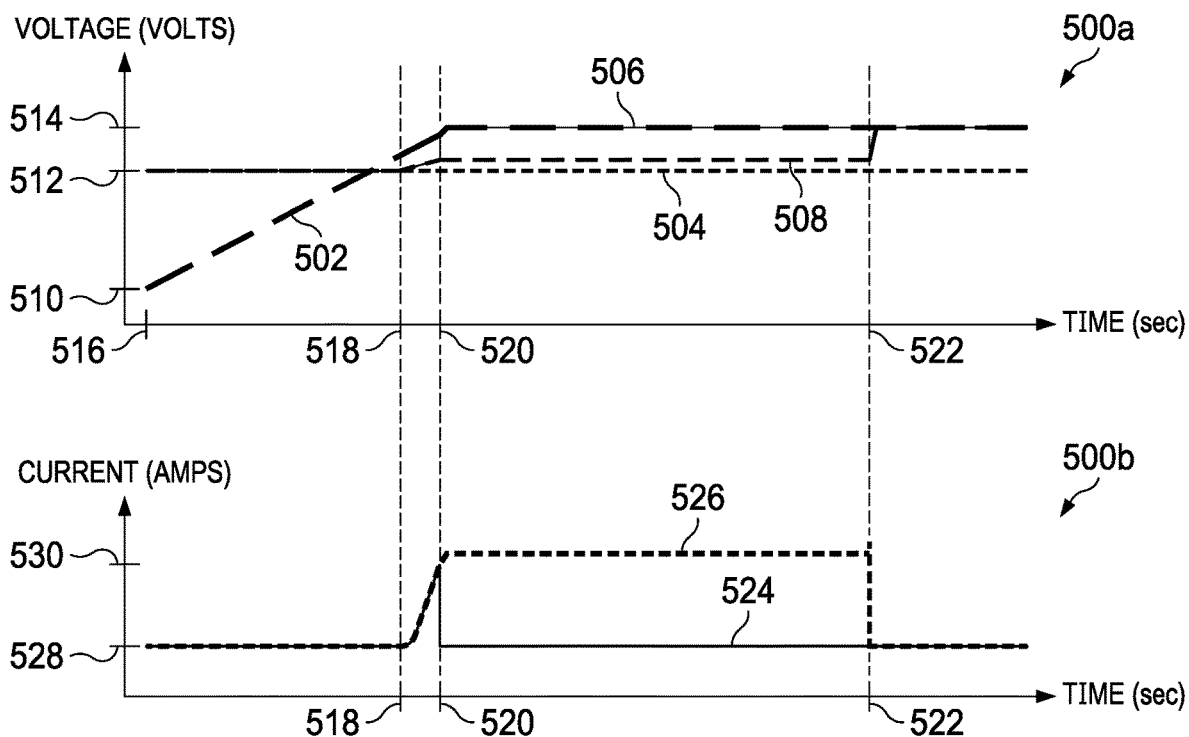
FIGS. 5 and 6 illustrate graphs of signals of a circuit comprising a DC-to-DC converter and a voltage selector circuit, according to one aspect of this description.

FIG. 5 illustrates graphs 500a and 500b of signals of a circuit (e.g., like that of FIG. 3A) that comprises a voltage selector circuit (e.g., 350 of FIG. 3A) and a DC-to-DC converter (e.g., 100 of FIG. 1) according to various aspects.

Graph 500a illustrates a first voltage 502, a second voltage 504, a first maximum voltage 506, and a second maximum voltage 508. In at least one example, the first voltage 502 continuously increases from a first magnitude 510 to a third magnitude 514. The second voltage 504 has a second magnitude 512 which remains constant.

In some instances, the first voltage 502 may correspond to the input voltage (e.g., V1 of FIG. 3A) of a DC-to-DC converter (e.g., 100 of FIG. 1) and may be provided to an input of the voltage selector circuit (e.g., 350 of FIG. 3A). Further, the second voltage 504 may correspond to the output voltage (e.g., V2 of FIG. 3A) of the DC-to-DC converter (e.g., 100 of FIG. 1) and may be provided to an input of the voltage selector circuit (e.g., 350 of FIG. 3A). The first maximum voltage 506 may correspond to the maximum voltage (e.g., Vmax of FIG. 3A) outputted by the voltage selector circuit (e.g., 350 of FIG. 3A). In at least one example, the second maximum voltage 508 may correspond to another maximum voltage outputted by another voltage selector circuit that does not comprise an adaptive current bias generator (e.g., 304 of FIG. 3A or 3B).

At a first time 516, the second voltage 504 is greater than the first voltage 502, such that magnitudes of the first and second maximum voltages 506, 508 are each equal to the second magnitude 512. At a second time 518 the first voltage 502 is greater than the magnitude of the second voltage 504. In some instances, at a third time 520, the voltage selector circuit (e.g., 350 of FIG. 3A) determines that the first voltage 502 is greater than the magnitude of the second voltage 504 and sets the first maximum voltage 506 to the magnitude of the first voltage 502. Subsequently, in another example, the another voltage selector circuit (not shown) that does not comprise an adaptive current bias generator may determine, at a fourth time 522, that the first voltage 502 is greater than the magnitude of the second voltage 504 and sets the second maximum voltage 508 to the magnitude of the first voltage 502. In at least one example, the voltage selector circuit (e.g., 350 of FIG. 3A) may have a response time (e.g., a difference between the second time 518 and the third time 520) of about 100 nanoseconds (ns), 120 ns, 130 ns, 140 ns, within a range of about 100 to 150 ns, or another suitable. Thus, by virtue of the voltage selector circuit (e.g., 350 of FIG. 3A) comprising the adaptive current bias generator (e.g., 304 of FIG. 3A or 3B), a change in the larger of the first and second voltages 502, 504 may be more quickly detected, thereby increasing a performance of the circuit (e.g., like that of FIG. 3A) and preventing damage to components of the DC-to-DC converter (e.g., 100 of FIG. 1).

Graph 500b illustrates a first current 524 that corresponds to the current across the body diode of the isolation device (e.g., 112 of FIG. 1) of the DC-to-DC converter (e.g., 100 of FIG. 1) that utilizes the voltage selector circuit (e.g., 302 of FIG. 3A) having the adaptive current bias generator (e.g., 304 of FIG. 3A or 3B). In at least one example, the graph 500b further illustrates a second current 526 that corresponds to the current across the body diode of another power switching device of another DC-to-DC converter that utilizes another voltage selector circuit (not shown) that does not comprise the adaptive current bias generator. In some instances, between the second time 518 and the third time 520, the first current 524 increases from a first current magnitude 528 to a second current magnitude 530. Subsequently, the first current decreases back to the first current magnitude 528. In at least one example, between the second time 518 and the third time 520, the second current 526 increases from the first current magnitude 528 to a third current magnitude that is greater than the second current magnitude 530. In at least one example, the second current 526 maintains this higher current from the third time 520 until the fourth time 522. Thus, by virtue of the voltage selector circuit (e.g., 350 of FIG. 3A) having a lower response time, a connection of the body diode of the isolation device (e.g., 112 of FIG. 1) may be more quickly switched in response to a change in the larger of the first and second voltages 502, 504, thereby increasing stability and endurance of the DC-to-DC converter (e.g., 100 of FIG. 1).

Figure 6:
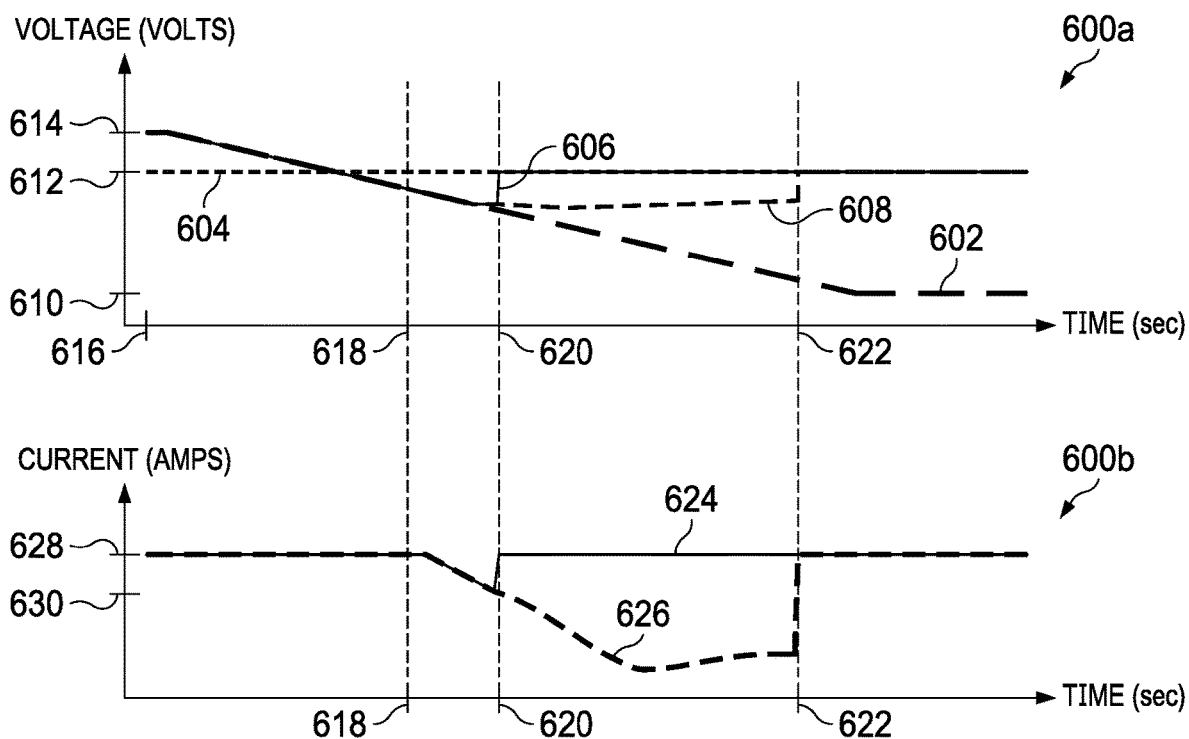

FIG. 6 illustrates graphs 600a and 600b of signals of a circuit (e.g., like that of FIG. 3A) that comprises a voltage selector circuit (e.g., 350 of FIG. 3A) and a DC-to-DC converter (e.g., 100 of FIG. 1) according to various aspects.

Graph 600a illustrate a first voltage 602, a second voltage 604, a first maximum voltage 606, and a second maximum voltage 608. In at least one example, the first voltage 602 continuously decreases from a third magnitude 614 to a first magnitude 610. The second voltage 604 has a second magnitude 612 which remains constant.

In some instances, the first voltage 602 may correspond to the input voltage (e.g., V1 of FIG. 1) of a DC-to-DC converter (e.g., 100 of FIG. 1) and may be provided to an input of the voltage selector circuit (e.g., 302 of FIG. 3A). Further, the second input voltage 604 may correspond to the output voltage (e.g., V2 of FIG. 3A) of the DC-to-DC converter (e.g., 100 of FIG. 1) and may be provided to an input of the voltage selector circuit (e.g., 302 of FIG. 3A). The first maximum voltage 606 may correspond to the maximum voltage (e.g., Vmax of FIG. 3A) outputted by the voltage selector circuit (e.g., 350 of FIG. 3A). In at least one example, the second maximum voltage 608 may correspond to another maximum voltage outputted by another voltage selector circuit that does not comprise an adaptive current bias generator (e.g., 304 of FIG. 3A or 3B).

At a first time 616, the first voltage 602 is greater than the second voltage 604, such that magnitudes of the first and second maximum voltages 606, 608 are each equal to the third magnitude 614. At a second time 618, the second voltage 612 is greater than the magnitude of the first voltage 602. In some instances, at a third time 620, the voltage selector circuit (e.g., 350 of FIG. 3A) determines that the second voltage 604 is greater than the magnitude of the first voltage 602 and sets the first maximum voltage 606 to the magnitude of the second voltage 604. Subsequently, in another example, the another voltage selector circuit (not shown) that does not comprise an adaptive current bias generator may determine, at a fourth time 622, that the second voltage 604 is greater than the magnitude of the first voltage 602 and sets the second maximum voltage 608 to the magnitude of the second voltage 604. In at least one example, the voltage selector circuit (e.g., 350 of FIG. 3A) may have a response time (e.g., a difference between the second time 618 and the third time 620) of about 100 ns, 130 ns, within a range of about 100 to 150 ns, or another suitable value. Thus, by virtue of the voltage selector circuit (e.g., 350 of FIG. 3A) comprising the adaptive current bias generator (e.g., 304 of FIG. 3A or 3B), a change in the larger of the first and second voltages 602, 604 may be more quickly detected, thereby increasing a performance of the circuit (e.g., like that of FIG. 3A) and preventing damage to components of the DC-to-DC converter (e.g., 100 of FIG. 1).

Graph 600b illustrates a first current 624 that corresponds to the current across the body diode of the isolation device (e.g., 112 of FIG. 1) of the DC-to-DC converter (e.g., 100 of FIG. 1) that utilizes the voltage selector circuit (e.g., 350 of FIG. 3A) having the adaptive current bias generator (e.g., 304 of FIG. 3A or 3B). In at least one example, the graph 600b further illustrates a second current 626 that corresponds to the current across the body diode of another power switching device of another DC-to-DC converter that utilizes another voltage selector circuit (not shown) that does not comprise the adaptive current bias generator. In some instances, between the second time 618 and the third time 620, the first current 624 decreases from a first current value 628 to a second current value 630. In at least one example, the first current value 628 may, for example, be about 0 amps or another suitable value, and the second current value 630 may be about −200 milliamps, −250 milliamps, or another suitable value. Subsequently, at the third time 620, the first current increases back to the first current value 628. In at least one example, between the second time 618 and the third time 620, the second current 626 decreases from the first current value 628 to a third current value that is less than the second current value 630. In at least one example, the second current 626 maintains this lower current from the third time 620 until the fourth time 622. Thus, by virtue of the voltage selector circuit (e.g., 350 of FIG. 3A) having a lower response time, a connect of the body diode of the isolation device (e.g., 112 of FIG. 1) may be more quickly switched in response to a change in the larger of the first and second voltages 602, 604, thereby increasing stability and endurance of the DC-to-DC converter (e.g., 100 of FIG. 1).

Figure 7:
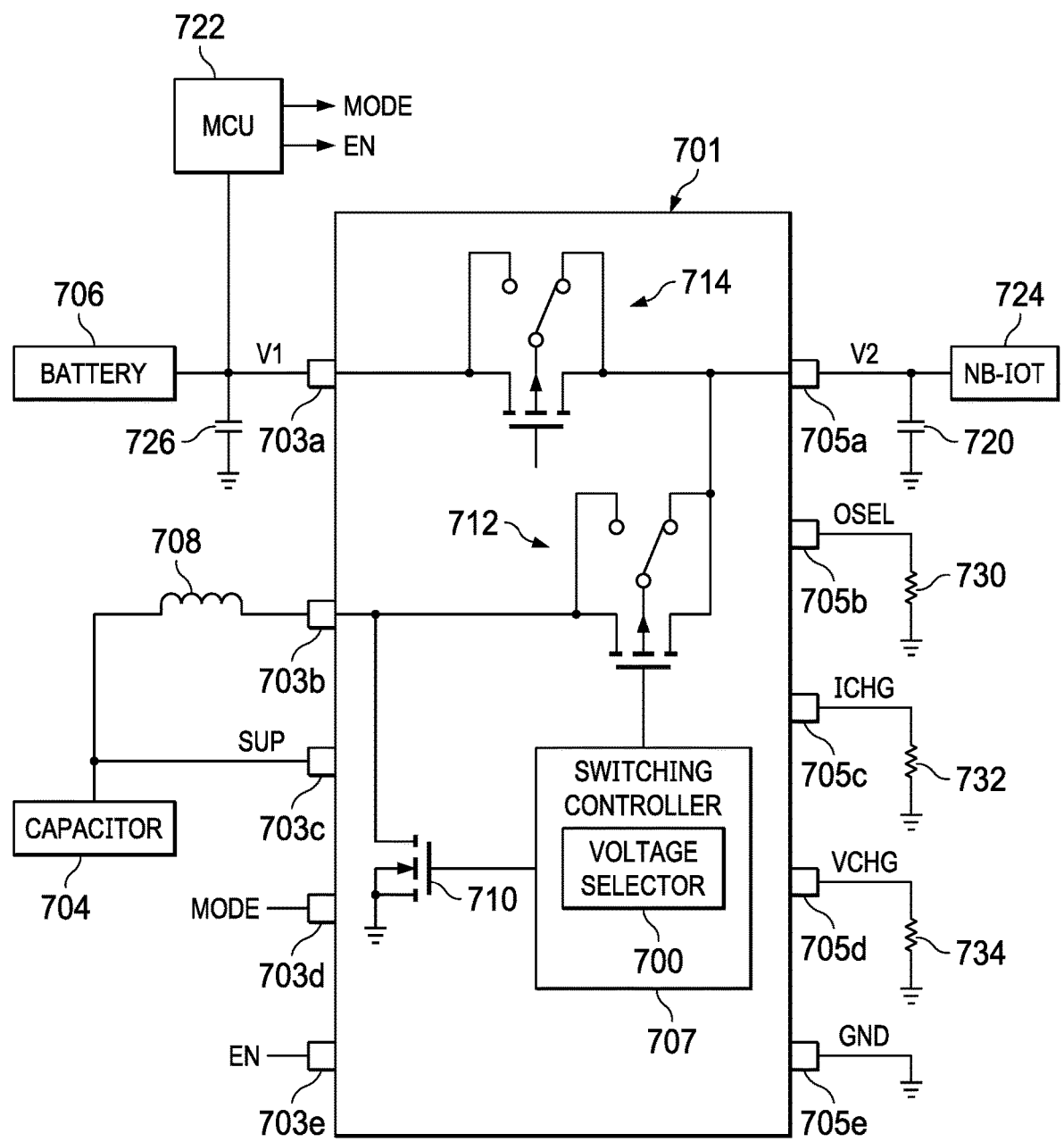
FIG. 7 illustrates a portable electronic device comprising a converter device and a switching controller including a voltage selector circuit, according to one aspect of this description.

FIG. 7 illustrates a portable electronic device comprising a converter device 701, a narrow band internet of things (NB-IOT) device 724, and a microcontroller unit (MCU) 722, according to one aspect of this description.

In at least one example, the converter device 701 has a plurality of input pins 703a-e and a plurality of output pins 705a-e. A battery 706 is coupled to a first input pin 703a of the converter device 701 and is configured to provide a first voltage V1 to the converter device 701. A first capacitor 726 is coupled between the first input pin 703a and ground. Further, the MCU 722 is coupled to the first input pin 703a. An inductor 708 is coupled to a second input pin 703b and a capacitor 704. The capacitor 704 may, for example, be a super capacitor, or the like. Further, the capacitor 704 is coupled to a third input pin 703c of the converter device 701. In some instances, the converter device 701 comprises a plurality of switching devices 710, 712, and 714. In at least one example, gates of a first switching device 710 and a second switching device 712 may be coupled to a switching controller 707. Further, the converter device 701 is configured to apply a second voltage V2 to a first output pin 705a. An output capacitor 720 is coupled between the first output pin 705a and ground. Further, the second voltage V2 is provided to the NB-IOT device 724. In addition, resistors 730, 732, 734 are coupled to output pins 705b-d of the converter device 701.

In at least one example, the switching controller 707 comprises a voltage selector circuit 700 that is configured to determine the larger of the first voltage V1 and the second voltage V2. In one aspect, the voltage selector circuit 700 may be configured as the voltage selector circuit of FIG. 1, 2, 3A, or 3B. The switching controller 707 is configured to apply control signals to the switching devices 710, 712, and/or 714 based on the determined larger of the first and second voltages V1, V2. By virtue of the voltage selector circuit 700 operating at a relatively low quiescent current (e.g., at nanoamp levels, about 1 nanoamp or less, or the like) during a shutdown mode of the portable electronic device, power consumption of the converter device 701 is reduced. This extends usage of the portable electronic device between charging operations, thereby increasing a performance of the portable electronic device. Further, by virtue of the voltage selector circuit 700 having a lower response time, damage to components of the converter device 701 is reduced, thereby increasing an endurance and stability of the portable electronic device.

Figure 8:
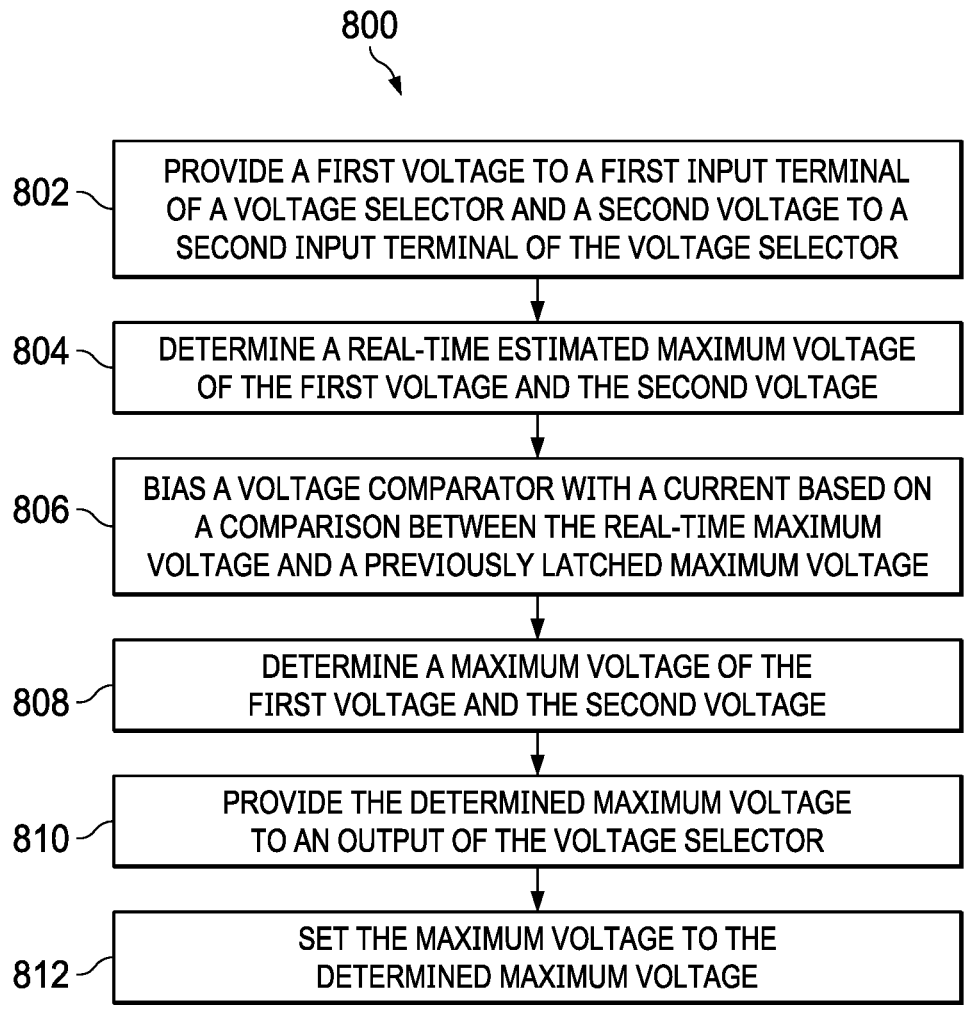
FIG. 8 illustrates a flow diagram of methods for operating a voltage selector circuit, according to one aspect of this description.

FIG. 8 illustrates a flow diagram of a method 800 for operating a voltage selector circuit comprising a voltage comparator and an adaptive current bias generator, according to one aspect of this description. While the method 800 is illustrated and described as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or examples of the description herein. Further, one or more of the acts depicted herein may be carried out in one or more separate acts and/or phases.

At act 802, a first voltage is provided to a first input terminal of a voltage selector circuit and a second voltage is provided to a second input terminal of the voltage selector circuit. FIGS. 3A and 4 illustrate a diagram and graphs 400a-c of some examples corresponding to act 802.

At act 804, an estimated maximum voltage of the first voltage and the second voltage is determined. FIGS. 3A and 4 illustrate a diagram and graphs 400a-c of some examples corresponding to act 804.

At act 806, a voltage comparator is biased with a current based on a comparison between the estimated maximum voltage and a reference voltage. FIGS. 3A and 4 illustrate a diagram and graphs 400a-c of some examples corresponding to act 806.

At act 808, a maximum voltage of the first voltage and the second voltage is determined. FIGS. 3A and 4 illustrate a diagram and graphs 400a-c of some examples corresponding to act 808.

At act 810, the determined maximum voltage is provided to an output of the voltage selector circuit. FIGS. 3A and 4 illustrate a diagram and graphs 400a-c of some examples corresponding to act 810.

At act 812, the reference voltage is set to the determined maximum voltage. FIGS. 3A and 4 illustrate a diagram and graphs 400a-c of some examples corresponding to act 812.

Thus, this description relates to a voltage selector circuit comprising an adaptive current bias generator for reducing a switching speed and power consumption of the voltage selector circuit.

In this description, the term "couple" may cover connections, communications or signal paths that enable a functional relationship consistent with this description. Accordingly, if device A generates a signal to control device B to perform an action, then: (a) in a first example, device A is coupled directly to device B; or (b) in a second example, device A is coupled to device B through intervening component C if intervening component C does not substantially alter the functional relationship between device A and device B, so device B is controlled by device A via the control signal generated by device A.

Modifications are possible in the described examples, and other implementations are possible, within the scope of the claims.

What is claimed is:

1. A voltage selector circuit, comprising:
    a voltage comparator having first and second comparator inputs and a comparator output, wherein the first comparator input is coupled to a first input voltage terminal, the second comparator input is coupled to a second input voltage terminal, the first input voltage terminal is configured to provide a first input voltage signal, and the second input voltage terminal is configured to provide a second input voltage signal;
    a multiplexer having a multiplexer input and a multiplexer output, wherein the multiplexer input is coupled to the comparator output, and the multiplexer is configured to select a larger signal of the first input voltage signal and the second input voltage signal, and provide the larger signal at the multiplexer output; and
    an adaptive current bias generator configured to generate a bias current for the voltage comparator during a transition from a first state to a second state, wherein the first input voltage signal is continuously larger than the second input voltage signal during the first state, and the second input voltage signal is continuously larger than the first input voltage signal in the second state, the bias current during the transition having a time-varying current level that is proportional to a time-varying difference between the first input voltage signal and the second input voltage signal during the transition.

2. The voltage selector circuit of claim 1, wherein the adaptive current bias generator is configured to generate the bias current to be substantially zero during the first and second states.

3. The voltage selector circuit of claim 1, wherein the multiplexer comprises:
   a first output switch coupled between the first input voltage terminal and the multiplexer output, and configured to provide selectively couple the first input voltage signal to an output of the multiplexer output when the first input voltage signal is larger than the second input voltage signal; and
   a second output switch coupled between the second input voltage terminal and the multiplexer output, and configured to provide the second input voltage signal to the multiplexer output when the second input voltage signal is larger than the first input voltage signal.

4. The voltage selector circuit of claim 3, wherein the adaptive current bias generator includes:
   a first transistor having a source coupled to the first input voltage terminal, a gate coupled to the second input voltage terminal, and a drain coupled to a first connection terminal;
   a second transistor having a source coupled to the second input voltage terminal, a gate coupled to the first input voltage terminal, and a drain coupled to the first connection terminal; and
   a third transistor having a source coupled to the first connection terminal node, and a gate coupled to the multiplexer output.

5. The voltage selector circuit of claim 1, wherein the adaptive current bias generator includes:
   a first transistor having a source coupled to the first input voltage terminal, a gate coupled to the second input voltage terminal, and a drain coupled to a first connection terminal;
   a second transistor having a source coupled to the second input voltage terminal, a gate coupled to the first input voltage terminal, and a drain coupled to the first connection terminal;
   a third transistor having a source coupled to the first connection terminal node, a gate coupled to the a larger voltage terminal, and a drain coupled to a second connection terminal, wherein the larger voltage terminal is the first input voltage terminal if the first input voltage signal is larger than the second input voltage signal, and the larger voltage terminal is the second input voltage terminal if the second input voltage signal is larger than the first input voltage signal; and
   a fourth transistor having a drain and a gate coupled to the second connection terminal and a source coupled to a ground terminal.

6. The voltage selector circuit of claim 5, wherein a threshold voltage of each of the first, second, and third transistors is less than a threshold voltage of a transistor within the voltage comparator.

7. The voltage selector circuit of claim 1, wherein the voltage comparator includes comprises:
   a first voltage comparator current path extending between a ground terminal and the first input voltage terminal, wherein the first voltage comparator current path includes a first voltage comparator output terminal, and a first voltage comparator current element between the first voltage comparator output terminal and the ground terminal; and
   a second voltage comparator current path extending between the ground terminal and the second input voltage terminal, wherein the second voltage comparator current path includes a second voltage comparator output terminal, and a second voltage comparator current element between the second voltage comparator output terminal and the ground terminal.

8. The voltage selector circuit of claim 7, wherein the bias current from the adaptive current bias generator is mirrored in the first voltage comparator current element and in the second voltage comparator current element.

9. The voltage selector circuit of claim 7, wherein the voltage comparator further includes:
   a first branch current path branching off from the first voltage comparator current path at a first branch point;
   a second branch current path branching off from the second voltage comparator current path at and a second branch point; and
   a third voltage comparator current path extending between the ground terminal and a terminal connecting the first branch current path and the second branch current path, the third voltage comparator current path comprising a third voltage comparator current element.

10. The voltage selector circuit of claim 9, wherein the bias current from the adaptive current bias generator is mirrored in each of the first voltage comparator current element, the second voltage comparator current element, and the third voltage comparator current element.

11. The voltage selector circuit of claim 9, wherein the first voltage comparator current path includes a first transistor coupled between the first input voltage terminal and the first branch point, and the second voltage comparator current path includes a second transistor coupled between the second input voltage terminal and the second branch point.

12. The voltage selector circuit of claim 11, wherein the terminal connecting the first branch current path and the second branch current path is coupled to a first gate of the first transistor and is coupled to a second gate of the second transistor.

13. The voltage selector circuit of claim 7, further including:
   a latch having first and second latch inputs and first and second latch outputs, wherein the first latch input is coupled to the first voltage comparator output terminal, the second latch input is coupled to the second voltage comparator output terminal, the first latch output is coupled to a first control terminal of a first switching device of the multiplexer, and the second latch output is coupled to a second switching device of the multiplexer.

14. A voltage comparator circuit, comprising:
   a first voltage comparator current path extending between a first input voltage terminal and a ground terminal, and having a first voltage comparator output terminal, and having a first voltage comparator current element coupled between the first voltage comparator output terminal and the ground terminal;
   a second voltage comparator current path extending between a second input voltage terminal and the ground terminal, and having a second voltage comparator output terminal, and having a second voltage comparator current element coupled between the second voltage comparator output terminal and the ground terminal; and an adaptive current bias generator having first and second generator inputs and a generator output, wherein the first generator input is coupled to the first input voltage terminal, the second generator input is coupled to the second input voltage terminal, and the generator output is coupled to the first voltage comparator current element and the second voltage comparator current element.

15. The voltage comparator circuit of claim 14, further comprising:
a first branch current path branching off from the first voltage comparator current path at a first branch point, and coupled to a voltage comparator terminal;
a second branch current path branching off from the second voltage comparator current path at a second branch point and coupled to the voltage comparator terminal; and
a third voltage comparator current path extending between the ground terminal and the voltage comparator terminal, wherein the third voltage comparator current path includes a third voltage comparator current element.

16. The voltage comparator circuit of claim 15, wherein the generator output is coupled to the third voltage comparator current element.

17. The voltage comparator circuit of claim 16, wherein the adaptive current bias generator is configured to provide generate a bias current that is mirrored in the first voltage comparator current element, the second voltage comparator current element, and the third voltage comparator current element.

18. The voltage comparator circuit of claim 14, wherein the adaptive current bias generator includes:
a first transistor having a source coupled to the first input voltage terminal, a gate coupled to the second input voltage terminal, and a drain coupled to a connection terminal; and
a second transistor having a source coupled to the second input voltage terminal and a gate coupled to the first input voltage terminal, and a drain coupled to the connection terminal.

19. A Direct Current (DC)-to-DC converter system, comprising:
a power supply configured to provide a first voltage;
a load configured to operate on a second voltage that differs from the first voltage;
a current path coupling the power supply to the load;
an isolation device arranged on the current path coupled between the power supply and the load, wherein the isolation device includes a first body bias switch coupled between a body of the isolation device and the power supply, and a second body bias switch coupled between the body of the isolation device and the load; and
a voltage selector circuit having first and second selector inputs and a selector output, wherein the first selector input is coupled to the power supply, the second selector input is coupled to the load, and the voltage selector circuit is configured to select a larger of the first voltage and the second voltage, and to provide a first control signal to the first body bias switch and a second control signal to the second body bias switch responsive to based on whether the first voltage or the second voltage is larger.

20. The DC-to-DC converter system of claim 19, wherein the voltage selector circuit includes:
a voltage comparator having first and second comparator inputs and a comparator output, wherein the first comparator input is coupled to the power supply, and the second comparator input is coupled to the load;
a multiplexer configured to select a larger of the first voltage and the second voltage responsive to the comparator output; and
an adaptive current bias generator configured to provide generate a bias current for the voltage comparator during a transition from a first state in which the first voltage is continuously larger than the second voltage to a second state in which the second voltage is continuously larger than the first voltage, wherein the bias current has a time-varying current level that is proportional to a time-varying difference between the first voltage and the second voltage.

* * * * *